(12) United States Patent
Zhang et al.

(10) Patent No.: US 8,825,436 B2
(45) Date of Patent: Sep. 2, 2014

(54) INERTIAL SENSING WITH SPATIALLY DISTRIBUTED SENSOR ARRAY AND TWO DIMENSIONAL DATA PROCESSING

(75) Inventors: Qiyue-John Zhang, Cupertino, CA (US); Ralph M. Kling, Sunnyvale, CA (US); Michael A. Horton, Moutain View, CA (US); Martin A. Williams, Danville, CA (US); David J. Zaziski, San Mateo, CA (US)

(73) Assignee: Moog Inc., East Aurora, NY (US)

( * ) Notice: Subject to any disclaimer, the term of this patent is extended or adjusted under 35 U.S.C. 154(b) by 127 days.

(21) Appl. No.: 13/044,175

(22) Filed: Mar. 9, 2011

(65) Prior Publication Data

US 2012/0232832 A1    Sep. 13, 2012

(51) Int. Cl.
*G01P 15/00* (2006.01)
*G01P 15/08* (2006.01)
*G01P 15/18* (2013.01)
*G01P 15/02* (2013.01)

(52) U.S. Cl.
CPC ............ *G01P 15/02* (2013.01); *G01P 15/08* (2013.01); *G01P 15/18* (2013.01)
USPC ........................................................ 702/141

(58) Field of Classification Search
CPC ....................................................... G01C 21/16
USPC ............................................................ 702/141
See application file for complete search history.

(56) References Cited

U.S. PATENT DOCUMENTS

| 4,566,327 | A | * | 1/1986 | Rider .............................. 73/510 |
| 7,650,238 | B2 | | 1/2010 | Reynolds et al. |
| 2010/0245131 | A1 | * | 9/2010 | Graumann ...................... 341/20 |

* cited by examiner

*Primary Examiner* — Stephen Cherry
(74) *Attorney, Agent, or Firm* — Hodgson Russ LLP

(57) ABSTRACT

A spatially distributed MEMS inertial sensor array is designed to reduce or cancel measurement errors and to increase the signal detection accuracy. By combining the measurements from a pair of sensors having sensing axes in two different, non-orthogonal directions, the correlated error due to the environmental changes are cancelled or reduced and the uncorrelated random noise is also reduced by the square root of two. By sequentially sampling the sensor array in the time domain, the number of the ADC circuits can be largely reduced. A two dimensional signal processing method is used to process the sensor array output data, in order to further reduce the remaining errors. Namely, one dimension uses the outputs from multiple spatially distributed sensor sets and the other dimension is the time domain. The signal to noise ratio is increased by using the signal correlation in both the spatial domain and the time domain.

13 Claims, 6 Drawing Sheets

100

200

INERTIAL SENSING WITH SPATIALLY DISTRIBUTED SENSOR ARRAY AND TWO DIMENSIONAL DATA PROCESSING

FIELD OF THE INVENTION

This invention relates generally to the field of guidance, navigation, and control systems and specifically to inertial sensors.

BACKGROUND

Conventional navigation-grade inertial sensors, such as quartz accelerometers, fiber optical gyroscopes and laser gyroscopes, are relatively expensive, large in size, and heavy in power consumption. These factors prevent their widespread use in many military and commercial applications. In contrast, a micro-electro-mechanical system (MEMS) navigation-grade inertial sensor, such as a MEMS gyroscope or accelerometer, is relatively inexpensive, much smaller in size, and consumes less power. Accordingly, it is feasible to build an inertial apparatus using multiple MEMS inertial sensors for many military and commercial applications.

A MEMS inertial sensor includes three dominating error components that combine to determine the overall accuracy of the sensor: (1) uncorrelated white noise, (2) a random constant bias, and (3) a temperature related bias. In light of these sources of error, one method of attempting to improve accuracy is to use the summation of the simultaneously digitized output of a concomitant sensor array, as described in U.S. Pat. No. 7,650,238 to Reynolds, et al., entitled "Environmental Characteristics Determination." However, the methods described therein only reduce the uncorrelated white noise among the sensors. The correlated error due to the environmental changes is not reduced in this manner. Additionally, the methods described therein use as many analog to digital converters (ADCs) as the number of sensors, which make the implementation costly and the printed circuit board assembly (PCBA) relatively large.

SUMMARY

Embodiments relate to a spatially distributed MEMS inertial sensor array that is designed to reduce or cancel measurement errors and to increase the signal detection accuracy. By combining the measurements from a pair of sensors having sensing axes oriented in two different, non-orthogonal directions, the correlated error due to the environmental changes are cancelled or reduced and the uncorrelated random noise is also reduced by the square root of two.

In one embodiment, by sequentially sampling the sensor array in the time domain, the number of the ADC circuits can be largely reduced. Specifically, the sampling rate is chosen to be higher than the dynamic of the motion which is to be measured by the sensor array. Additionally, anti-aliasing filters may be applied before sampling.

In one embodiment, a two dimensional signal processing method is used to process the sensor array output data, in order to further reduce the remaining errors. Namely, one dimension uses the outputs from multiple spatially distributed sensor sets and the other dimension is the time domain. The signal to noise ratio is increased by making use of the signal correlation in both the spatial domain and the time domain.

Another implementation is to direct a combination of the analog signals of the sensors to a module that applies an oversampling technique to reduce the un-correlated noise level and detect the signals. This implementation can largely reduce the apparatus size and cost by reducing the number of ADCs.

DETAILED DESCRIPTION OF INVENTION

Embodiments relate to a spatially distributed MEMS inertial sensor array that is designed to reduce or cancel measurement errors and to increase the signal detection accuracy. Inertial signals, such as gravity, earth rotation rate, and device motion such as linear acceleration and rotation are orientation related. However, the majority of measurement errors are non-orientation related. Thus, by combining the measurements from two sensors having sensing axes oriented in two different, non-orthogonal directions, the correlated error due to the environmental changes are cancelled or reduced and the uncorrelated random noise is also reduced by the square root of two (i.e., the signal to noise ratio is increased by a factor of the square root of two). Thus, the MEMS inertial sensor bias and noise density can be largely reduced, which is important for use in navigation, guidance, and gyro compassing systems. Compared to conventional inertial systems, an inertial system designed according to embodiments of this invention can be smaller in size, lighter in weight, lower cost, and lower power consumption, while maintaining performance at least as good as conventional inertial systems.

System Architecture

Figure 1:
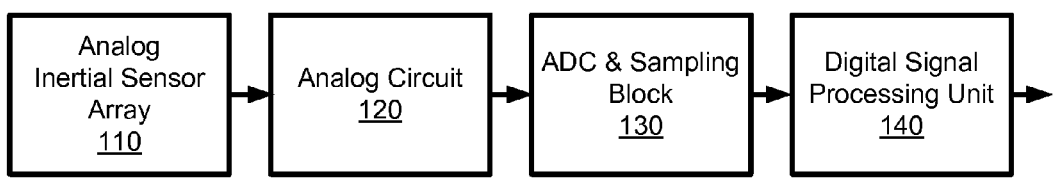
FIG. 1 is a block diagram illustrating a system including an analog inertial sensor array, according to one embodiment of the invention.
Figure 2:
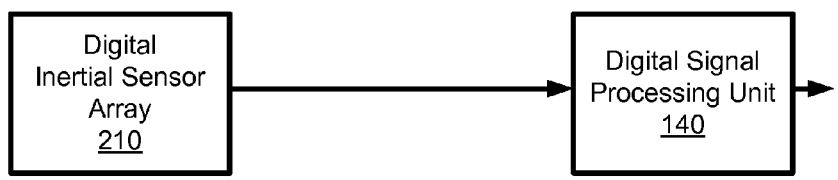
FIG. 2 is a block diagram illustrating a system including a digital inertial sensor array, according to one embodiment of the invention.

Embodiments of the invention are systems that measure specific forces or angular rates of changes using multiple pairs of sensors in a spatially distributed array. FIGS. 1 and 2 illustrate different system architectures based on whether analog or digital sensors are used. FIG. 1 is a block diagram illustrating a system 100 that uses analog sensors according to one embodiment of the invention. The system 100 includes an analog inertial sensor array 110, an analog circuit 120, an ADC and sampling block 130, and a digital signal processing unit 140.

The analog inertial sensor array 110 comprises inertial sensors, such as accelerometers or gyroscopes. The inertial sensors are used to measure specific force or the angular rate of change. As will be described below in greater detail, the sensors are selected and installed in special orientations to cancel or reduce the environment-related errors in the measurement. The output of the analog inertial sensor array 110 is received by the analog circuit 120.

The analog circuit 120 filters the sensor output signals and combines them to increase the signal to noise ratio. The output of the analog circuit 120 is received by the ADC and sampling block 130.

The ADC and sampling block 130 samples the analog signal received from the analog circuit 120 and converts the analog signal to a digital signal. In one embodiment, the sampling rate is chosen to be higher than the dynamic of the motion which is to be measured by the sensor array. Typically, the sampling rate is chosen to be at least twice the rate of the dynamics of the motion. Additionally, in some embodiments, anti-aliasing filters may be applied before sampling. The bandwidth of the anti-alias filter should be less than the Nyquist Frequency that is half the sampling frequency. The ADC and sampling block 130 outputs the digital signal to the digital signal processing unit 140. One or more ADC integrated circuits can be used to convert the analog signals to digital signals dependent on the embodiments. The ADC resolution and dynamic range, e.g., the number of bits, have to be chosen correctly to cover the analog signal dynamic range and to meet the resolution requirement of the application systems. The sampling can be performed sequentially to reduce the number of ADC circuits.

The digital signal processing unit 140 processes the sampled measurement received from the ADC and sampling block 130. In one embodiment, the digital signal processing unit 140 performs two dimensional data processing techniques to further increase the signal to noise ratio, and thus reduce the velocity angle random walk or angle random walk. Example two dimensional data processing techniques are described in further detail in the Processing Sensor Measurements section below.

FIG. 2 is a block diagram illustrating a system 200 that uses digital sensors according to another embodiment of the invention. The system 200 includes a digital inertial sensor array 210 and a digital signal processing unit 140. In the example of FIG. 2, because the output of the digital inertial sensor array 210 is already a digital signal, there is no need to process it through an analog circuit 120 or an ADC and sampling block 130 before it is received by the digital signal processing unit 140. However, the digital signal processing unit 140 may still perform two dimensional data processing techniques to increase the signal to noise ratio, as described in further detail in the Processing Sensor Measurements section below.

Sensor Array Architecture

Figure 3:
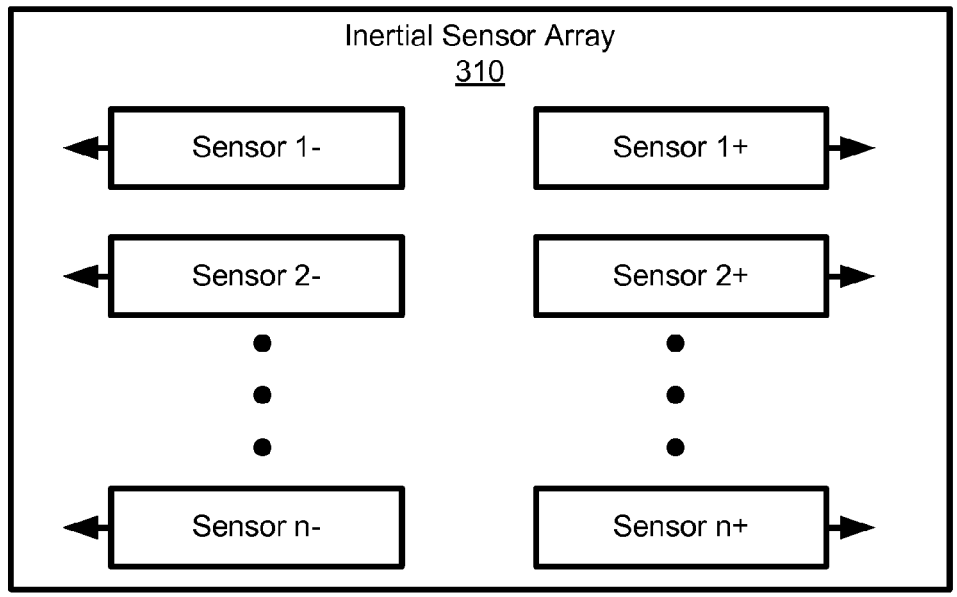
FIG. 3 illustrates an example arrangement of sensors in an inertial sensor array, according to one embodiment of the invention.

FIG. 3 illustrates an example arrangement of sensors in an inertial sensor array, according to one embodiment of the invention. A pair of sensors with similar bias behavior, such as having similar thermal characteristics is selected as a set. One or multiple of the sensor sets are used in the array. In the example arrangement shown in FIG. 3, the two sensors of each pair are positioned such that their input axes are pointed to opposite directions. For example, the pair of sensors labeled "Sensor 1−" and "Sensor 1+" are oriented to point in opposite directions, such that Sensor 1− is pointed to the left and Sensor 1+ is pointed to the right. In this particular arrangement, all the pairs are positioned in parallel with each other as shown in FIG. 3.

Figure 4:
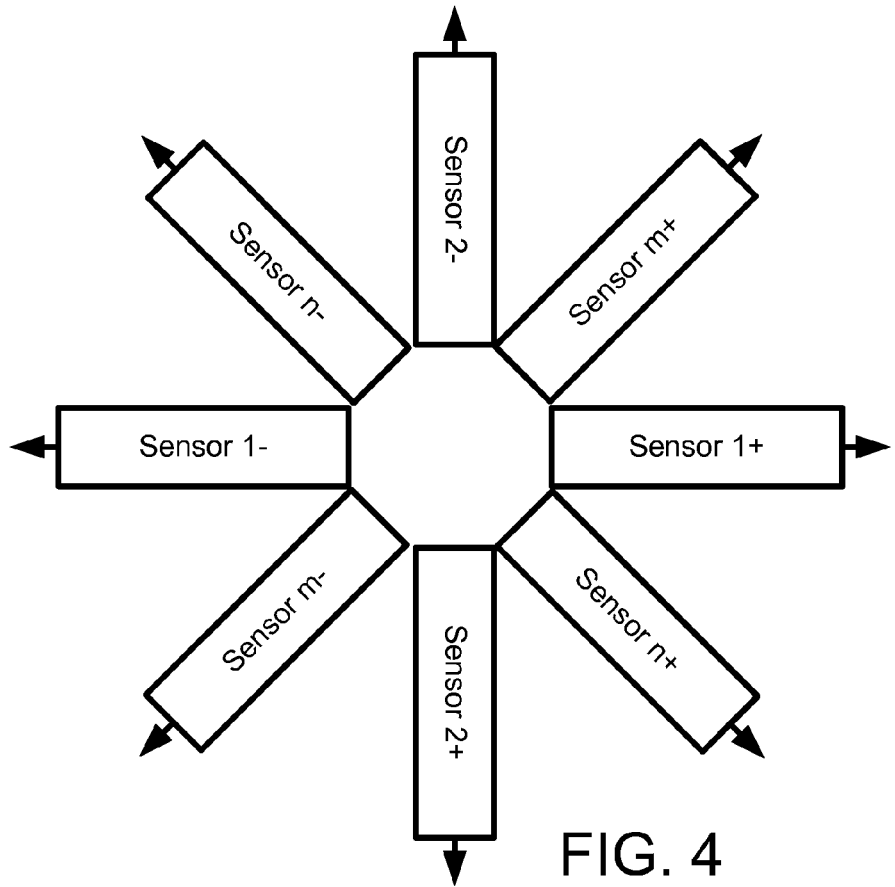
FIG. 4 illustrates another example arrangement of sensors in an inertial sensor array, according to one embodiment of the invention.

FIG. 4 illustrates another example arrangement of sensors in an inertial sensor array, according to one embodiment of the invention. The two sensors of each pair are positioned so that their input axes are pointed to opposite directions, and if more than one pair is used in the array, their input axes can be positioned in different directions, for example by evenly distributing them within approximately 360 degrees. If the angles are evenly distributed within 360 degrees, such as shown in FIG. 4, the array is a two-axis inertial sensor.

It is noted that FIGS. 3 and 4 are merely example arrangement of sensors. In accordance with the principles of the present invention, a pair or set of pairs of inertial sensors with similar bias behavior are selected and installed in a way that their sensing axes point in any non-orthogonal directions. In such an arrangement, the combination of the measurements from these sensors results in the correlated error due to the environment changes being cancelled or reduced, and the uncorrelated random noise is being reduced by the square root of two.

Sensor Measurement

The measurement of an inertial sensor can be described using the following equation:

$$v/s = x(t) + b + e(T) + w(t) \quad (1)$$

Where v is the sensor output and s is a scale factor. The function x(t) is the inertial signal such as specific force or angular rate of change, which may change over time, t. The constant bias, b, can be calibrated before installation. The error related to the environment, e, is represented as a function of temperature, T. The pair of sensors is chosen such that their errors related to the environment, e(T), are similar. The function w(t) is the measurement noise which may also change over time, t.

The measurement of sensor i+ can be expressed as $$\tilde{x}_{i+} = x(t) + b_{i+} + e_{i+}(T) + w_{i+}(t) \quad (2)$$

The measurement of sensor i− can be expressed as $$\tilde{x}_{i-} = -x(t) + b_{i-} + e_{i-}(T) + w_{i-}(t) \quad (3)$$

The combination of sensor i+ and sensor i−

$$\tilde{x}_i = (\tilde{x}_{i+} - \tilde{x}_{i-})/2 \quad (4)$$

Substituting equation (2) and equation (3) into equation (4), $$\tilde{x}_i = x(t) + (b_{i+} - b_{i-})/2 + [e_{i+}(T) - e_{i-}(T)]/2 + (w_{i+}(t) - w_{i-}(t))/2 \quad (5)$$

Equation (5) shows that the correlated errors e(T) are reduced or cancelled due to their similarity. It is noted that errors e(T) are the major error source for MEMS inertial sensors. Additionally, the variance of the uncorrelated noise w(t) will be reduced by $\sqrt{2}$. The variance of the random constant bias b will also be reduced by $\sqrt{2}$ statistically.

Processing Measurement Signals

Figure 5:
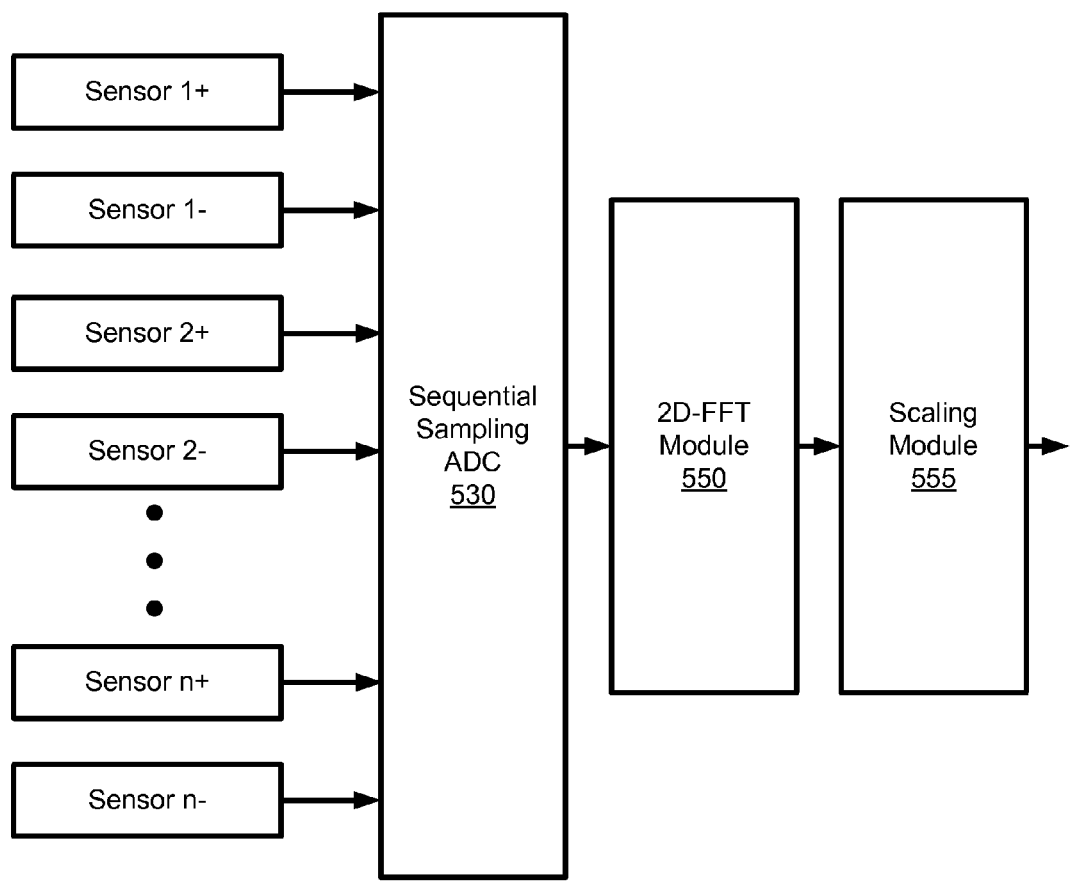
FIG. 5 is a block diagram illustrating an example system for performing two-dimensional Fast Fourier Transform based signal processing, according to an embodiment of the invention.
Figure 6:
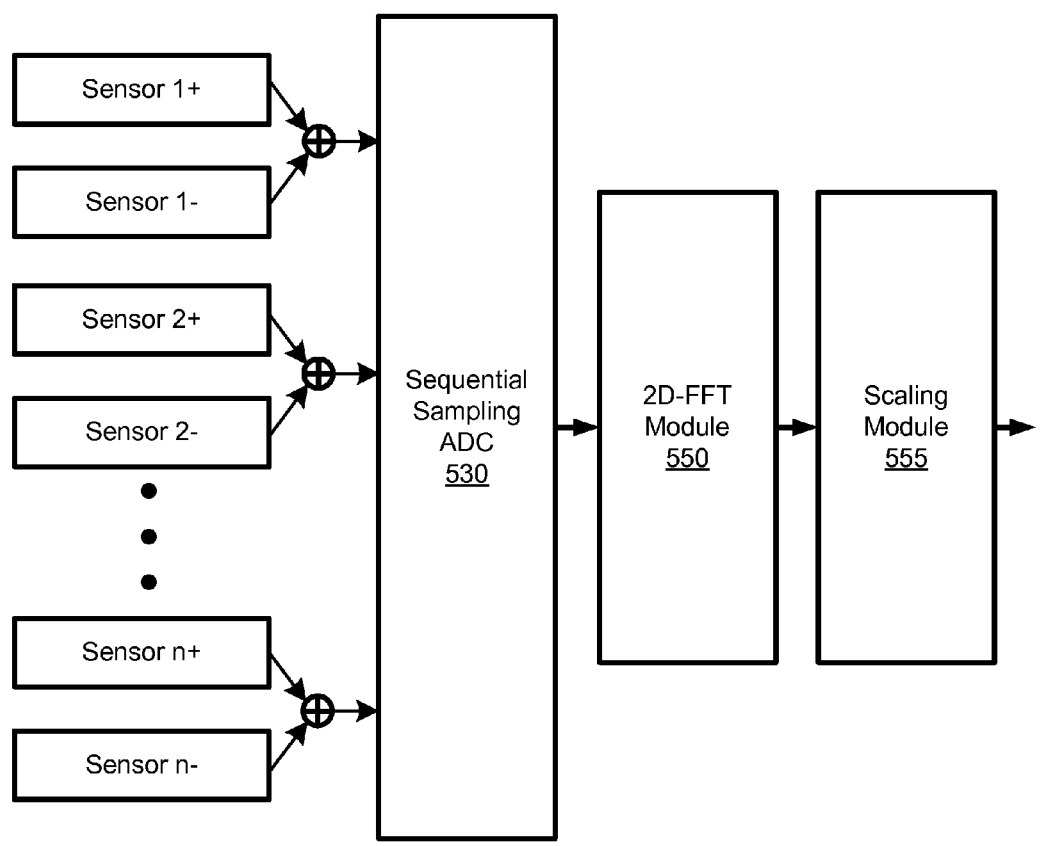
FIG. 6 is a block diagram illustrating another example system for performing two-dimensional Fast Fourier Transform based signal processing, according to an embodiment of the invention.

There are several methods for processing the measurement signals received by the inertial sensor array 110. The techniques illustrated in FIGS. 5 and 6 are applicable to analog or digital arrays. FIG. 5 is a block diagram illustrating an example system for performing two-dimensional Fast Fourier Transform based signal processing, according to an embodiment of the invention. In the example of FIG. 5, the sequential sampling ADC 530 sequentially samples the measurement data from each sensor of the array. The output of the sequential sampling ADC 530 is received by the two dimension Fast Fourier Transform (2D FFT) module 550. The 2D FFT module can be implemented in a digital circuit in ASIC form/FPGA form or discrete digital circuit form. It may also be implemented by a digital signal processor or any kind of CPU with adequate memory. One dimension of the 2D-FFT is the number of the sensor pairs. If the array consists of 16 sensors, the input of the first dimension of the FFT has 8 points. The second dimension of the FFT is along the time axis. The number of points is dependent on the sampling frequency and the dynamic bandwidth of the system. The 2D-FFT module 550 is used to detect the correlated signal and suppress the uncorrelated noises among the sensors in the time domain. Then, the scaling module 555 applies a scaling function for scaling the detected signal and providing the required resolution. The resolution is dependent on the number of bits used to present the measurements and the dynamic range of the measurement. The scaling function is to scale the signal to an appropriate magnitude to cover the signal dynamic range with the chosen bit numbers. For example, the 16 bits are used to present +/−4 g measurement. The scaling function needs to scale the signal range of 8 g to be presented by 16 bits, and the resolution will be 8/65536 g.

FIG. 6 is a block diagram illustrating another example system for performing two-dimensional Fast Fourier Transform based signal processing, according to an embodiment of the invention. In this example, the analog signals for each pair of sensors is combined, and then the signals from the pairs are sequentially sampled by the sequential sampling ADC 530.

Figure 7:
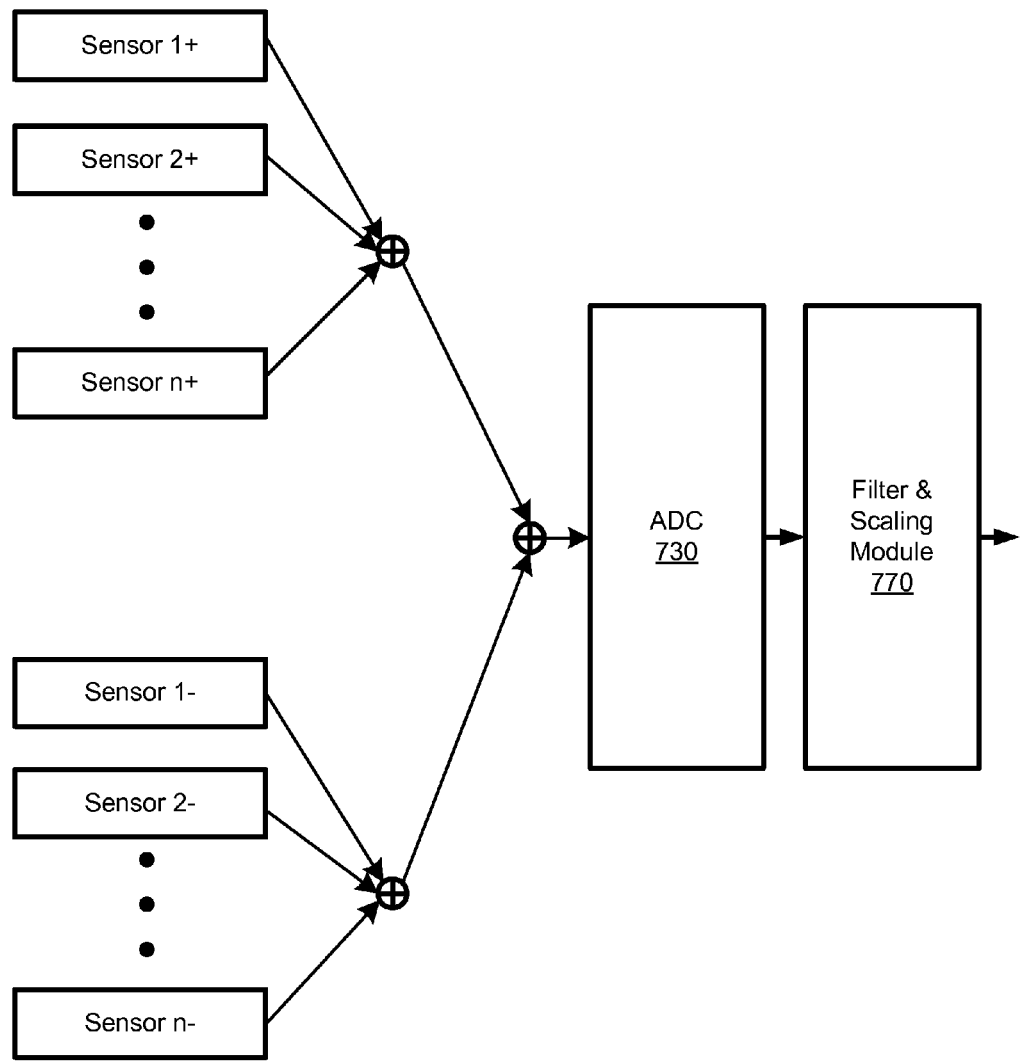
FIG. 7 is a block diagram illustrating an example system for performing analog summation based signal processing, according to an embodiment of the invention.

FIG. 7 is a block diagram illustrating an example system for performing analog summation based signal processing, according to an embodiment of the invention. This embodiment is applicable to analog inertial sensors, and it reduces the complexity of the ADC and digital sampling. First, the sensor analog outputs which have their input axis pointing in the same direction are summed first. Then, these summations are combined to form a single analog signal. This single analog signal is then transmitted to the ADC 710 to be converted into a digital signal that is further processed by the filter and scaling module 770. In this example, a single ADC is dedicated to sample the analog signal, and the sampled digital signal may be filtered and scaled by module 770 to reduce the noise level in order to obtain the desired measurement resolution. The scaling and resolution is similar to what is described with respect to FIG. 5. The digital filter is used to smooth the noise and achieve more resolution by oversampling techniques. For example, by averaging 256 16-bits samples we can achieve 4 bits more resolution if the signal contains the perfect equally distributed noise. In general, the digital filter applied to oversampled data will improve the resolution of the measurement.

Figure 8:
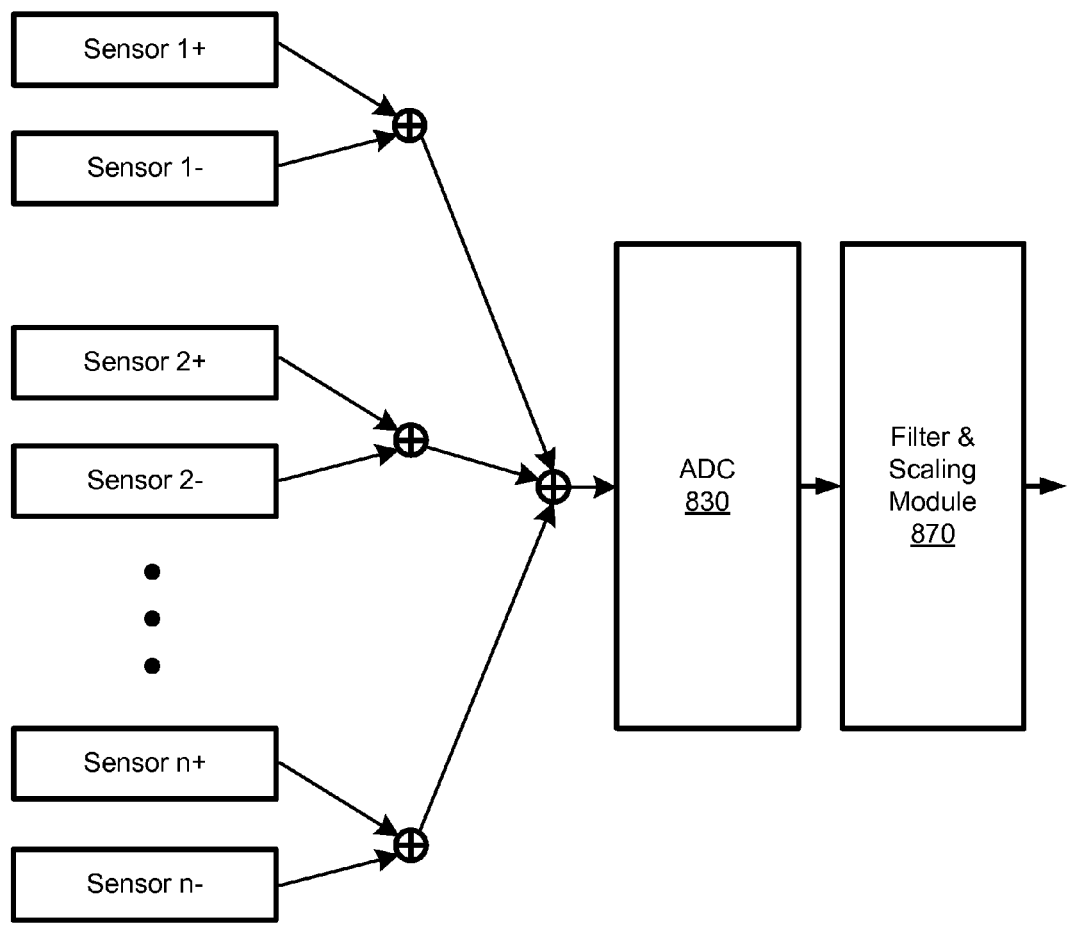
FIG. 8 is a block diagram illustrating another example system for performing analog summation based signal processing, according to an embodiment of the invention.

FIG. 8 is a block diagram illustrating another example system for performing analog summation based signal processing, according to an embodiment of the invention. This embodiment is also applicable to analog inertial sensors, and it reduces the complexity of the ADC and digital sampling. First, two sensors of the same pair are combined, and then the resulting combination of each pair are summed. Then, this single analog signal is received by the ADC 830 to be converted into a digital signal that is further processed by the filter and scaling module 870. The filtering and scaling is analogous to the techniques described with reference to FIG. 7.

Although the detailed description contains many specifics, these should not be construed as limiting the scope of the invention, but merely as illustrating different examples and aspects of the invention. It should be appreciated that the scope of the invention includes other embodiments not discussed in detail above. Various other modifications, changes and variations which will be apparent to those skilled in the art may be made in the arrangement and details of the apparatus and methods of the invention disclosed herein without departing from the spirit and scope of the invention.

What is claimed is:

1. A spatially distributed micro-electro-mechanical system (MEMS) inertial sensor array apparatus, comprising:
    a plurality of pairs of MEMS inertial sensors, each pair having sensing axes oriented in two different, non-orthogonal directions, wherein the sensors have similar bias behavior, and have similar thermal characteristics, and the sensors measure angular rate of change; and
    an analog circuit that combines the output of the sensors of the inertial sensor array to increase the signal to noise ratio by reducing the correlated error due to environmental changes
    an analog to digital converter and sampling block that converts output of the analog circuit to a digital signal;
    a digital signal processing unit that processes the digital signal received from the analog to digital converter and sampling block wherein the digital signal processing unit performs two dimensional data processing to increase the signal to noise ratio, and wherein the digital signal processing unit comprises a two dimension Fast Fourier Transform module to perform two dimension Fast Fourier Transform, wherein a first dimension is a number of measurement data pairs, and a second dimension is time, wherein the measurement data pairs are derived from the inertial sensors.

2. The apparatus of claim 1, wherein the sensing axes of each pair of sensors are oriented to point in opposite directions.

3. The apparatus of claim 2, wherein the pairs of sensors are arranged in parallel with each other.

4. The apparatus of claim 2, wherein the sensing axes of each pair of sensors are evenly distributed within approximately 360 degrees.

5. The apparatus of claim 1, wherein the digital signal processing unit further comprises a scaling module that applies a scaling function.

6. The apparatus of claim 1, wherein the sensors comprise digital sensors, further comprising a digital signal processing unit to process output from the digital sensors by performing two dimensional data processing.

7. The apparatus of claim 1, wherein analog signals from each pair of sensors is combined, and then the combined signals from each pair is sequentially sampled by a sequential sampling analog to digital converter.

8. The apparatus of claim 1, wherein analog signals from each sensor having an input axis pointing in the same direction are summed, then the summations are combined to form a single analog signal which is transmitted to an analog to digital converter.

9. The apparatus of claim 1, wherein analog signals from each pair of sensors are combined, and then the combinations of each pair are summed into a single analog signal which is transmitted to an analog to digital converter.

10. A method comprising:
    sensing inertial signals with at least one pair of MEMS inertial sensors having sensing axes oriented in two different, non-orthogonal directions, wherein the sensors have similar bias behavior, and the sensors measure angular rate of change; and
    processing the inertial signals using a two dimension Fast Fourier Transform module to perform two dimension Fast Fourier Transform, wherein a first dimension is a number of measurement data pairs, and a second dimension is time, wherein the measurement data pairs are derived from the inertial sensors.

11. The method of claim 10, further comprising sequentially sampling the inertial signals sensed with the MEMS inertial sensors.

12. The method of claim 10, further comprising combining the inertial signals sensed by the inertial sensors to increase the signal to noise ratio by reducing correlated error due to environmental changes.

13. The method of claim 10, further comprising scaling a detected signal output from the two dimension Fast Fourier Transform module.

* * * * *